United States Patent [19]

Mascher

[11] 4,112,048
[45] Sep. 5, 1978

[54] AIR-REGENERATION FILTER

[76] Inventor: Werner Mascher, Bismarckstr. 6, 1000 Berlin 41, Fed. Rep. of Germany

[21] Appl. No.: 735,503

[22] Filed: Oct. 26, 1976

Related U.S. Application Data

[63] Continuation of Ser. No. 523,805, Nov. 14, 1974, abandoned.

[30] Foreign Application Priority Data

Nov. 17, 1973 [DE] Fed. Rep. of Germany ....... 2357512

[51] Int. Cl.$^2$ ............................................ B01D 53/34
[52] U.S. Cl. ................................. 423/210; 423/230; 422/122; 422/123; 422/119
[58] Field of Search ............... 423/210, 247, 230, 579, 423/581; 23/252 R, 281, 282, 284

[56] References Cited

U.S. PATENT DOCUMENTS

| 1,111,055 | 9/1914 | Carveth | 423/579 X |
| 2,913,317 | 11/1959 | Bovard | 23/281 |
| 2,961,303 | 11/1960 | Wiswesser | 23/284 |
| 3,403,981 | 10/1968 | Lemcke et al. | 23/281 |
| 3,410,191 | 11/1968 | Jackson | 423/230 |
| 3,655,346 | 4/1972 | Cotabish et al. | 23/281 |

Primary Examiner—Earl C. Thomas
Attorney, Agent, or Firm—Parmelee, Johnson, Bollinger & Bramblett

[57] ABSTRACT

An air-regeneration filter is provided having air regeneration agent means toward one end opening thereof and drying agent means toward an opening at the other end thereof. The direction of air flow through the filter can be chosen according to the requirement for conditioning the air to be treated as to oxygen and moisture content.

8 Claims, 1 Drawing Figure

U.S. Patent  Sept. 5, 1978  4,112,048
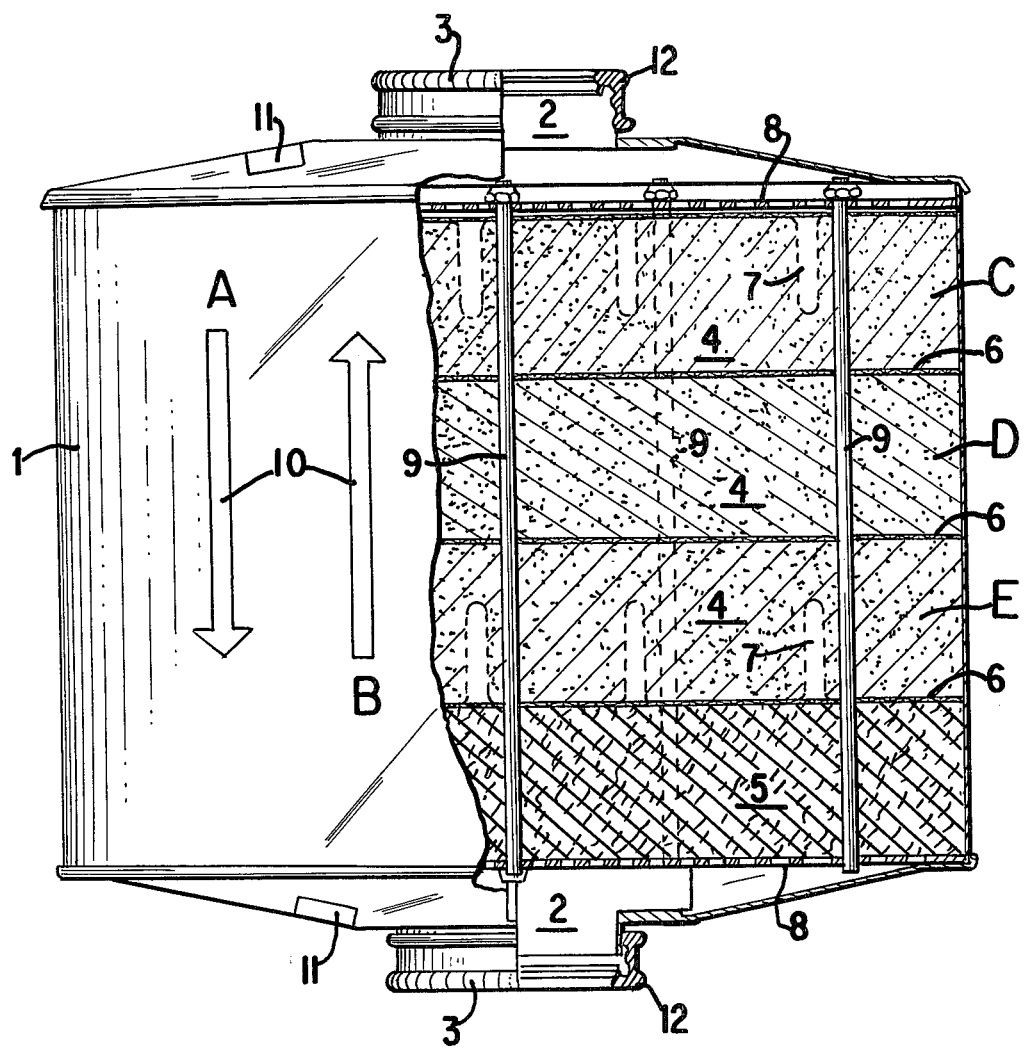

AIR-REGENERATION FILTER

This is a continuation of application Ser. No. 523,805 filed Nov. 14, 1974, now abandoned.

The present invention relates to an air-regeneration filter in a container containing an oxygen-liberating carbon-dioxide-binding chemical and a drying agent, with two openings on opposite sides adapted to be closed by friction-closing closure caps, predominately for connection to an air-feed device.

Such a filter which can be traversed by air is required in closed rooms or in a closed respiratory system when the supplying of outside air is not feasible. The renewal of the respiratory air is therefore effected within the closed space independently of the outer atmosphere.

Alkali peroxides and particularly potassium peroxide are advantageously used for the regeneration of the air. These chemicals absorb the carbon dioxide exhaled and the moisture present in the air within the space and give off oxygen accordingly.

This principle is employed in various proposals for the development of air-regeneration filters. One particular problem in this connection is to adapt the production of oxygen to the requirement. For instance, the water vapor fed to the filter will under certain conditions always lead to an over production of oxygen while, on the other hand, a given content of water vapor in the air to be regenerated is necessary since the conversion of the exhaled carbon dioxide alone does not cover the oxygen requirement.

In one prior apparatus of this type, screens and/or sheet metal cups on which layers of granulated alkali peroxide, extending from one wall of the housing to the other, lie, are arranged in the container transverse to the direction of flow. In each of the layers there is an opening at a predetermined distance from the wall of the housing. These openings are staggered with respect to each other from layer to layer. While the resistance to flow is reduced by this arrangement, the utilization of the chemical is not particularly good. In addition to this, the cost of producing a filter of this type is very high. Further, adaptation of the production of oxygen to the requirement is not possible or contemplated in this development of the apparatus.

In another known apparatus, alkali peroxides pressed into the shape of discs are used. As a result of the greater density of chemical obtained thereby, a larger quantity of oxygen can be stored per unit of volume but the discs must be compressed which, because of their fragility, must not be too thin. When the discs are thicker, such results in an unfavorable utilization of the chemical. An over production of oxygen at the start of the use is tolerated. A subsequent decrease in the development of oxygen results from the fact that the chemical, as a compressed disc, is not pervious to air and accordingly the reaction can take place only on the surface of the discs which, during the course of the reaction, gradually become encrusted by spent chemical so as to be partially inactive. It is not possible in this way to control the production of oxygen as a function of the amount of water vapor offered. An oxygen deficiency can also occur with the passage of time as a result of the uncontrolled decrease in the production of oxygen.

In another proposal, a drying agent and an absorption agent for carbon dioxide are arranged in the container in front of the chemical in order to dampen or check the production of oxygen. Since the direction of flow is fixed, certain disadvantages result from the fact that under certain conditions, this filter may not supply sufficient oxygen and furthermore the use of the oxygen produced may be greatly delayed. This is true when the moisture present in the space is slight, for instance, at low room temperatures, since on the one hand the exhaled carbon dioxide is substantially absorbed and existing moisture and moisture produced are taken up substantially completely by the drying agent. The desired dampening of the production of oxygen is not well defined and can therefore also lead to an oxygen deficiency. The filter can not be adapted to the different climatic conditions in the rooms produced by seasonal variations.

An apparatus is also known in which regulation of the oxygen production is provided. The apparatus consists of two filters connected in parallel, one filter containing the oxygen-liberating chemical, while the second filter has the function of only absorbing carbon dioxide. The two filters are each provided with a separate feed device for the air in the room. By means of a switch or valving, the room air is conducted as desired, as a function of the oxygen content in the room, through the filter which gives off the oxygen or through the filter which binds the carbon dioxide.

This apparatus is in principle capable of maintaining the oxygen content within given limits under different climatic conditions but the technical expenditure is great.

One of the objects of the present invention is to disclose the construction of an air-regeneration filter which avoids the above-mentioned disadvantages and is simple to manufacture and which can be adapted for use under different conditions.

This goal is achieved in accordance with the invention by the fact that the construction of the filter permits two directions of flow. There are markings on the outer wall of the container which indicate the proper direction of flow in each case on basis of the climate to be treated. The drying agent can be arranged on one side facing an opening, the agent being in front of the layer of chemical. The drying agent can amount to 10 to 50%, and preferably 25 to 30%, of the volume of the total filling.

The advantage obtained with the air-regeneration filter of the invention is that it is possible, corresponding to the existing climatic conditions, to control the development of oxygen uniformly in accordance with the oxygen requirement and in this way avoid unfavorable, i.e. excessively low or excessively high oxygen contents, and to obtain optimum utilization of the filter. This result is achieved by the construction of the filter which takes into account the content of water vapor present in the room which may be different, regardless of the number of persons present in the room.

In the case of low content of water vapor, for instance, less than 13 $g/m^3$ in the room air, or low room temperatures, for instance, below 15° C, at which only correspondingly low water-vapor contents result due to the saturation values of water vapor in air, the required amount of oxygen is produced when the chemical which gives off the oxygen is acted on directly by the room air. In this case the filter is so connected into the air feed device that the direction of flow A is established or chosen by valving or insertion in the piping.

With higher contents of water vapor or higher room temperatures, direct impact on the chemical would result in an overproduction of oxygen. By the establishment of the direction of flow in the direction indicated by arrow B, the air flowing into the filter is predried to such an extent that the amount of oxygen developed corresponds to the requirement. The drying agent which is arranged in front of the chemical exerts a certain regulating function also from the standpoint of time in the embodiment indicated since its water-absorbing action is large particularly at the start of use when the chemical still has its full effect. On the other hand, the action of the drying agent decreases just towards the end of the use of the filter when the chemical, as a result of its state of exhaustion, requires a higher supply of water.

The effective surface of attack of the chemical is increased by pleated sieves between which the chemical is embedded and which are arranged 90° away from each other, and the danger of the upper layer forming a firm crust is reduced. In this way there is little resistance to flow, and this resistance does not increase substantially during operation.

Finally, it is possible in this way to operate with a relatively fine approximately uniform particle size of chemical so that a greater density of chemical and simplification of the manufacture of the filter is made possible.

In accordance with the invention it is furthermore proposed that temperature or moisture indicating devices be arranged at a visible place in the vicinity of the openings, i.e. the connections, in order to judge the climatic conditions. These indicating devices make it possible to note, even during operation, whether it is advisable to change the direction of flow when the temperature or moisture of the air entering the filter changes accordingly.

The provision of such a temperature indicating device in the vicinity of each of the two openings affords the possibility of noting the degree of exhaustion of the filter from the temperature of the emerging air. The temperature in the filter increases during operation as a result of the reaction and decreases when the chemical is consumed. The temperature indicating means can be any conventional type of thermal indicating device located on the outside of the container and in thermal contact therewith or can be inside the container with a suitable viewing area in the wall of the container. Conventional moisture indicating devices also can be located adjacent said opening.

In the drawing, the FIGURE shows a partial section through one embodiment of the invention.

The container 1 contains the chemical 4, which is an oxygen-liberating carbon-dioxide-binding chemical, such as alkali peroxide, and the drying agent 5, such as alumina gel, held by the perforated plates 8 which are connected together by clamping bolts 9. Chemical 4 is arranged in several layers, C, D, E, separated from each other by inserts of wire gauze 6, between pleated sieves 7. Potassium peroxide is particularly efficacious for regeneration of air. The pleated sieves 7 are arranged with their folds 90° apart from each other (not shown in the drawing).

The container 1 has two openings 2 located on opposite sides, which are sealed by frictional closure by the caps 3 with a tin seal 12. As mentioned, temperature or moisture measuring devices 11 are arranged in visible position on or in the container near the openings 2.

The air-regeneration filter is placed in operation by removing the caps 3 from the container 1 and connecting an air feed device (not shown) with due consideration of the desired direction of flow 10, which direction is indicated on the container 1 by markings, for instance A and B. Also, it would be possible to insert the filter in piping or valving (not shown) so as to selectively choose flow direction.

The drying agent may, for example, be a suitable drying agent gel, such as alumina gel. The drying agent is developed spherically with a diameter of 2 to 10 mm. and preferably 4 to 8 mm. The drying agent amounts to 10 to 50% and preferably 25 to 30% of the volume of the total filling.

What is claimed is:

1. A reversible air-regeneration filter for producing a relatively constant quantity of oxygen by selectively varying the moisture content of air, which includes carbon dioxide, passed therethrough, said filter comprising:
   a container;
   alkali peroxide for reacting with moisture and carbon dioxide present in said air to produce oxygen;
   alumina gel for removing moisture from said air;
   said container having first and second openings, said alkali peroxide being positioned within said container adjacent to said first opening and said alumina gel being positioned within said container adjacent to said second opening,
   means for controlling the direction of flow of said air through said filter such that said air selectively communicates directly with said alkali peroxide or such that said air first communicates with said alumina gel before communicating with said alkali peroxide,
   whereby said reversible filter produces a relatively constant amount of oxygen which is uneffected by variations in the moisture content of said air to be regenerated.

2. A reversible air filter as claimed in claim 1 further comprising means for covering said first and second openings when said air filter is not in use.

3. A reversible air filter as claimed in claim 1 wherein said alkali peroxide and said alumina gel are in layer form.

4. A reversible air filter as claimed in claim 3 wherein the upper layer of said alkali peroxide is adjacent to said first opening of said container and has depressed areas extending inwardly into said upper layer for exposing a greater surface area of said upper layer for reducing the possibility of crusting of said upper layer and for reducing the resistance of said air flow therethrough.

5. A reversible air filter as claimed in claim 3 wherein the lower layer of said alkali peroxide is adjacent to said alumina gel and said lower layer has depressed areas extending inwardly into said alkali peroxide.

6. A reversible air-regeneration filter as claimed in claim 3 further comprising means for indicating the moisture content of said air to be regenerated.

7. A reversible air-regeneration filter as claimed in claim 5 further comprising means for indicating the temperature of said air to be regenerated.

8. A method of regenerating air with the aid of a reversible air filter including a container, alkali peroxide, alumina gel and means for controlling the direction of flow of air to be regenerated, said container having first and second openings, said alkali peroxide adjacent to said first opening and said alumina gel adjacent to said second opening, the steps of said method including
   determining the moisture content of said air to be regenerated applying said air to be regenerated to said first opening of said container if said moisture content is below a predetermined level, applying said air to be regenerated through said second opening of said container if said moisture content is above a predetermined level whereby the amount of oxygen produced is relatively constant and uneffected by variations in the moisture content of said air to be regenerated.

* * * * *

UNITED STATES PATENT OFFICE
CERTIFICATE OF CORRECTION

Patent No. 4,112,048  Dated September 5, 1978

Inventor(s) Werner Mascher

It is certified that error appears in the above-identified patent and that said Letters Patent are hereby corrected as shown below:

Claim 6, Line 2: Change "3" to -- 1 --.

Claim 7, Line 2: Change "5" to -- 1 --.

Signed and Sealed this

Sixth Day of March 1979

[SEAL]

Attest:

RUTH C. MASON
*Attesting Officer*

DONALD W. BANNER
*Commissioner of Patents and Trademarks*